US012679920B2

(12) United States Patent
Saito

(10) Patent No.: US 12,679,920 B2
(45) Date of Patent: Jul. 14, 2026

(54) RESIN COMPOSITION, ADHESIVE MEMBER, AND DISPLAY DEVICE INCLUDING THE ADHESIVE MEMBER

(71) Applicant: Samsung Display Co., LTD., Yongin-si (KR)

(72) Inventor: Yosuke Saito, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 290 days.

(21) Appl. No.: 18/387,161

(22) Filed: Nov. 6, 2023

(65) Prior Publication Data

US 2024/0218105 A1     Jul. 4, 2024

(30) Foreign Application Priority Data

Jan. 3, 2023     (KR) ......................... 10-2023-0000665

(51) Int. Cl.
| | |
|---|---|
| *C08F 265/06* | (2006.01) |
| *B32B 7/12* | (2006.01) |
| *C09D 11/107* | (2014.01) |
| *C09D 11/38* | (2014.01) |
| *C09J 151/00* | (2006.01) |

(52) U.S. Cl.
CPC .............. *C08F 265/06* (2013.01); *B32B 7/12* (2013.01); *C09D 11/107* (2013.01); *C09D 11/38* (2013.01); *C09J 151/003* (2013.01); *B32B 2457/20* (2013.01)

(58) Field of Classification Search
CPC ................................................... C08F 265/06
See application file for complete search history.

(56) References Cited

U.S. PATENT DOCUMENTS

| | | | |
|---|---|---|---|
| 11,578,153 B2 | 2/2023 | Nakamura et al. | |
| 2022/0056288 A1* | 2/2022 | Liu ........................ | C09D 11/10 |

FOREIGN PATENT DOCUMENTS

| | | |
|---|---|---|
| JP | 2012237965 A | 12/2012 |
| JP | 5994426 B2 | 9/2016 |
| JP | 6160744 B2 | 6/2017 |
| JP | 6229763 B2 | 10/2017 |
| JP | 6241838 B2 | 11/2017 |
| JP | 6481167 B2 | 2/2019 |
| JP | 6528103 B2 | 5/2019 |
| JP | 2020070304 A | 5/2020 |
| JP | 6783995 B2 | 10/2020 |
| JP | 6806468 B2 | 12/2020 |
| JP | 7086991 B2 | 6/2022 |
| KR | 102133892 B1 | 7/2020 |
| KR | 1020210114353 A | 9/2021 |
| KR | 1020210134959 A | 11/2021 |
| KR | 102417454 B1 | 7/2022 |
| WO | 2019116479 A1 | 6/2019 |

* cited by examiner

*Primary Examiner* — Vu A Nguyen
(74) *Attorney, Agent, or Firm* — CANTOR COLBURN LLP

(57) ABSTRACT

A resin composition includes: at least one (meth)acrylate oligomer having a glass transition temperature of about 110° C. to about 140° C.; at least one (meth)acrylate monomer including a (meth)acryloyl group; at least one urethane (meth)acrylate oligomer, and at least one photoinitiator. The resin composition has a shear viscosity of about 8 mPa·s to about 50 mPa·s, which is measured by a JIS Z8803 method at a temperature of about 25° C.

23 Claims, 8 Drawing Sheets

RESIN COMPOSITION, ADHESIVE MEMBER, AND DISPLAY DEVICE INCLUDING THE ADHESIVE MEMBER

This application claims priority to Korean Patent Application No. 10-2023-0000665, filed on Jan. 3, 2023, and all the benefits accruing therefrom under 35 U.S.C. § 119, the content of which in its entirety is herein incorporated by reference.

BACKGROUND

The present disclosure herein relates to a resin composition, an adhesive member formed using the resin composition, and a display device including the adhesive member.

Various display devices used in multimedia devices such as televisions, cellular phones, tablet computers, navigations and game consoles are being developed. Particularly, the development on a display device provided with a flexible display member that may be bent for improving the convenience of users and capable of folding, bending or rolling, is being conducted. The members included in the flexible display device are required to confirm reliability in folding or bending operation. In addition, an adhesive resin used for forming an adhesive layer applied in various shapes of display devices is required to show excellent coatability on the members of the various shapes of display devices.

SUMMARY

The present disclosure provides a resin composition having excellent discharge stability and high adhesiveness after curing, an adhesive member formed using the resin composition, and a display device including the adhesive member.

An embodiment of the invention provides a resin composition including: at least one (meth)acrylate oligomer having a glass transition temperature of about 110 degrees in Celsius (° C.) to about 140° C.; at least one (meth)acrylate monomer including a (meth)acryloyl group; at least one urethane (meth)acrylate oligomer: and at least one photoinitiator, where the resin composition has a shear viscosity of about 8 millipascal seconds (mPa·s) to about 50 mPa·s, which is measured by a JIS Z8803 method at a temperature of about 25° C.

In an embodiment, a weight of the at least one (meth) acrylate oligomer may be about 1 percentage by weight (wt %) to about 20 wt % with respect to a total weight of the resin composition.

In an embodiment, the at least one (meth)acrylate oligomer may include a copolymer derived from a first monomer and a second monomer which is different from the first monomer.

In an embodiment, each of the first monomer and the second monomer may include any one among (meth)acrylic acid methyl, (meth)acrylic acid isobornyl, (meth)acrylic acid dicyclopentanyl, (meth)acrylic acid cyclohexyl, and (meth)acrylic acid adamantyl.

In an embodiment, the copolymer may include a first repeating unit derived from the first monomer, and a second repeating unit derived from the second monomer, and a composition ratio of the first repeating unit and the second repeating unit may be about 5:5 to about 9:1.

In an embodiment, a polydispersity index of the copolymer may be about 1.2 to about 1.7.

In an embodiment, a weight-average molecular weight of the at least one (meth)acrylate oligomer may be about 4000 to about 20,000.

In an embodiment, a weight-average molecular weight of the at least one urethane (meth)acrylate oligomer may be about 5000 to about 40,000.

In an embodiment, a weight of the at least one (meth) acrylate monomer may be about 40 wt % to about 90 wt % with respect to a total weight of the resin composition.

In an embodiment, the at least one (meth)acrylate monomer may include at least one among 4-hydroxybutyl acrylate, 2-ethylhexyl acrylate, tetrahydrofurfuryl acrylate, and 2-ethylhexyl-diglycol acrylate.

In an embodiment, the resin composition may have a 180° peel strength of about 300 gf/25 mm to about 1500 gf/25 mm at room temperature with respect to a glass substrate after ultraviolet curing in the presence of oxygen.

In an embodiment, the at least one photoinitiator may include a radical polymerization initiator.

In an embodiment, the resin composition may be provided by an inkjet printing method or a dispensing method.

Another embodiment of the invention provides an adhesive member including a polymer derived from a resin composition having a shear viscosity of about 8 mPa·s to about 50 mPa·s, which is measured by a JIS Z8803 method at a temperature of about 25° C., where the resin composition includes: at least one (meth)acrylate oligomer having a glass transition temperature of about 110° C. to about 140° C.; at least one (meth)acrylate monomer including a (meth) acryloyl group; at least one urethane (meth)acrylate oligomer; and at least one photoinitiator.

In an embodiment, the adhesive member may have a 180° peel strength of about 300 gf/25 mm to about 1500 gf/25 mm at room temperature with respect to a glass substrate.

In an embodiment, a weight of the at least one (meth) acrylate oligomer may be about 1 wt % to about 20 wt % with respect to a total weight of the resin composition.

In an embodiment, the at least one (meth)acrylate oligomer may include a copolymer derived from a first monomer and a second monomer which is different from the first monomer.

In an embodiment, each of the first monomer and the second monomer may include any one among (meth)acrylic acid methyl, (meth)acrylic acid isobornyl, (meth)acrylic acid dicyclopentanyl, (meth)acrylic acid cyclohexyl, and (meth)acrylic acid adamantyl.

In an embodiment, a weight of the at least one (meth) acrylate monomer may be about 40 wt % to about 90 wt % with respect to a total weight of the resin composition.

Another embodiment of the invention provides a display device including: a display panel: a window disposed on the display panel; and an adhesive member disposed between the display panel and the window and including a polymer derived from a resin composition having a shear viscosity of about 25° C. of about 8 mPa·s to about 50 mPa·s, which is measured by a JIS Z8803 method at a temperature, where the resin composition includes: at least one (meth)acrylate oligomer having a glass transition temperature of about 110° C. to about 140° C.; at least one (meth)acrylate monomer including a (meth)acryloyl group; at least one urethane (meth)acrylate oligomer; and at least one photoinitiator.

In an embodiment, the adhesive member may have a 180° peel strength of about 300 gf/25 mm to about 1500 gf/25 mm at room temperature with respect to a glass substrate.

In an embodiment, the display device may further include a light controlling layer disposed between the adhesive member and the window, and an optical adhesive layer disposed between the light controlling layer and the window, wherein the optical adhesive layer may include the polymer derived from the resin composition.

In an embodiment, the display device may be divided into a folding area foldable with respect to a folding axis, and a non-folding area adjacent to the folding area.

BRIEF DESCRIPTION OF THE FIGURES

The accompanying drawings are included to provide a further understanding of the invention and are incorporated in and constitute a part of this specification. The drawings illustrate embodiments of the invention and, together with the description, serve to explain principles of the invention. In the drawings.

DETAILED DESCRIPTION

Figure 1:
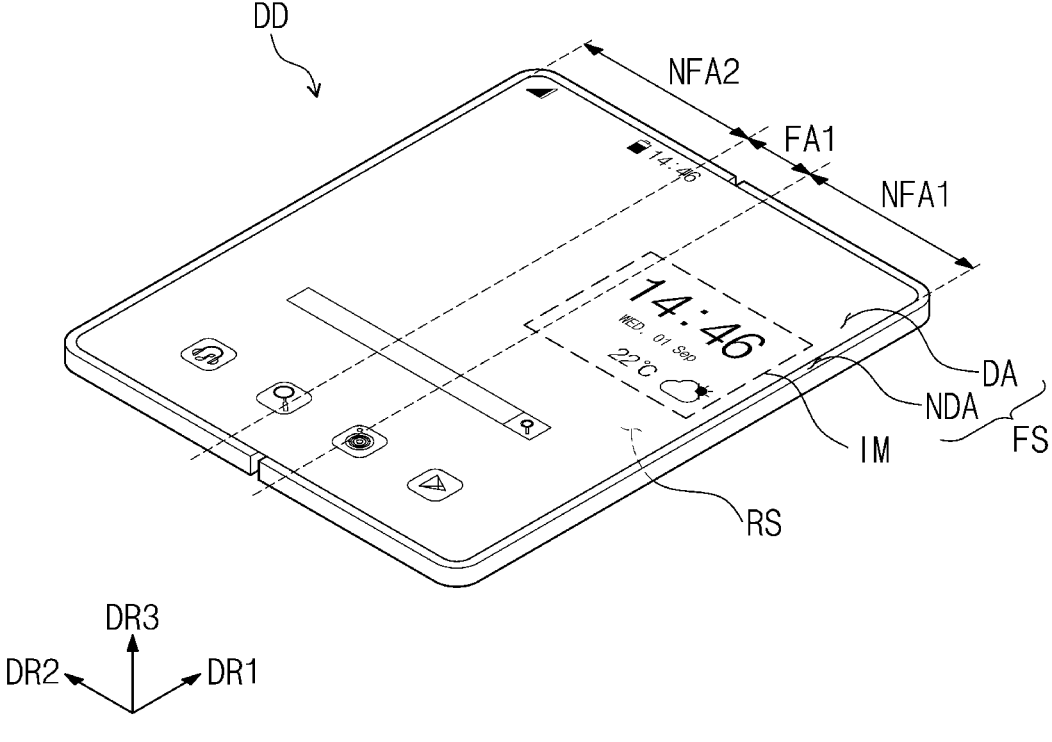
FIG. 1 is a perspective view showing a display device of an embodiment.

The invention may have various modifications and may be embodied in different forms, and example embodiments will be explained in detail with reference to the accompany drawings. The invention may, however, be embodied in different forms and should not be construed as limited to the embodiments set forth herein. Rather, all modifications, equivalents, and substituents which are included in the spirit and technical scope of the invention should be included in the invention.

In the description, when an element (or a region, a layer, a part, etc.) is referred to as being "on", "connected with" or "combined with" another element, it can be directly connected with/bonded on the other element, or intervening third elements may also be disposed.

Like reference numerals refer to like elements throughout. In the drawings, the thicknesses, ratios, and dimensions of elements are exaggerated for effective explanation of technical contents. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "and/or" may include one or more combinations that may define relevant elements.

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, a second element could be termed a first element. As used herein, the singular forms are intended to include the plural forms as well, unless the context clearly indicates otherwise.

In addition, the terms "below", "beneath", "on" and "above" are used for explaining the relation of elements shown in the drawings. The terms are relative concept and are explained based on the direction shown in the drawing.

It will be further understood that the terms "comprises" and/or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. In addition, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Figure 2A:
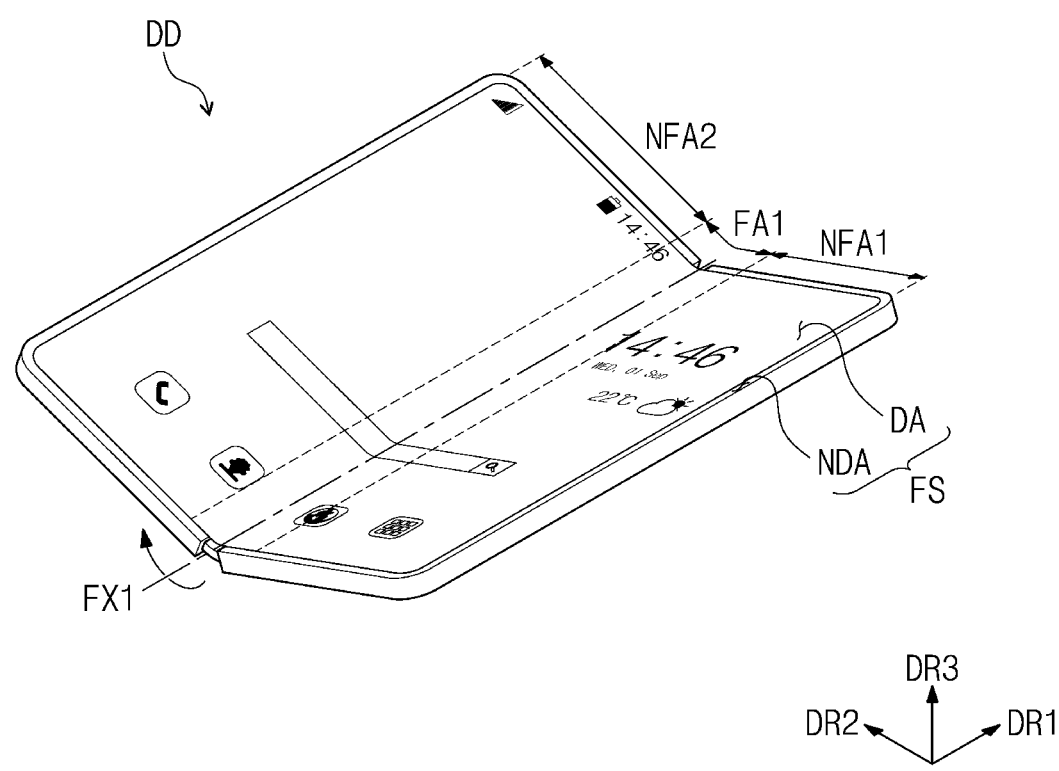
FIG. 2A is a perspective view showing a display device according to an embodiment.
Figure 2B:
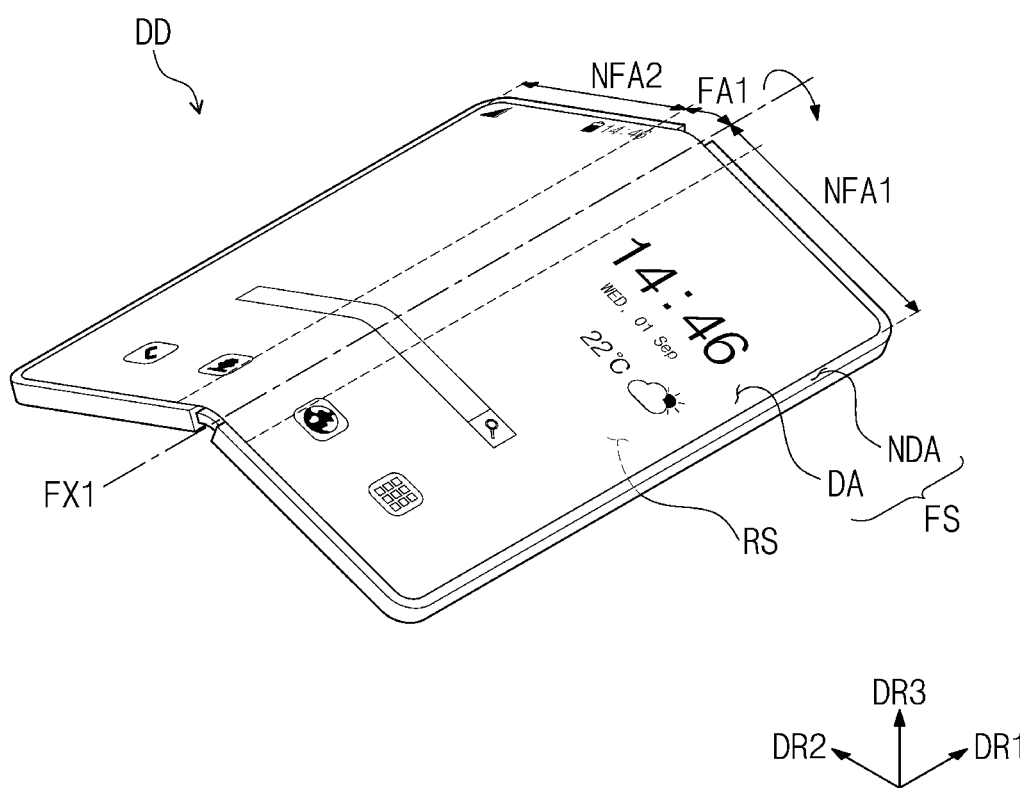
FIG. 2B is a perspective view showing a display device according to an embodiment.

Hereinafter, an adhesive member of an embodiment and a display device of an embodiment will be explained referring to the drawings. FIG. 1 is a perspective view showing a display device of an embodiment. FIG. 2A is a perspective view showing an inner-folding process of the display device shown in FIG. 1. FIG. 2B is a cross-sectional view showing an outer-folding process of the display device shown in FIG. 1.

A display device DD of an embodiment may be a device activated according to electrical signals. The display device DD may be a flexible device. In an embodiment, for example, the display device DD may be a portable electronic device, a tablet, a car navigation, a game console, a personal computer, a laptop computer, or a wearable device, but an embodiment of the invention is not limited thereto. FIG. 1 illustrates a portable electronic device as the display device DD.

The display device DD may display images IM through a display surface FS. The display surface FS may include a display area DA and a non-display area NDA. The display area DA may be an area activated according to electrical signals. The display device DD may display images IM through the display area DA. In addition, various types of external pressure may be sensed in the display area DA. The non-display area NDA may be adjacent to the display area DA. The non-display area NDA may surround the display area DA.

Accordingly, the shape of the display area DA may substantially be defined by the non-display area NDA. However, this is an illustration, and the non-display area NDA may be disposed adjacent to only one side of the display area DA, or may be omitted. The display surface FS may include a plane defined by a first direction axis DR1 and a second direction axis DR2.

The rear surface RS of the display device DD may be a surface oppositely disposed to the display surface FS. In an embodiment, for example, videos or images may not be displayed outwardly on the rear surface RS. Differently, the rear surface RS may play the role of a second display surface displaying videos or images.

In the description, a first direction axis DR1 and a second direction axis DR2 are orthogonal to each other, and a third direction axis DR3 may be a normal line direction with respect to a plane defined by the first direction axis DR1 and the second direction axis DR2. The thickness direction of the display device DD may be a direction parallel to the third direction axis DR3. Based on the third direction axis DR3, the front surface (or top surface or upper side) and rear surface (or bottom surface or lower side) may be defined. The front surface (or top surface or upper side) means a surface (or direction) adjacent to the display surface FS, and the rear surface (or bottom surface or lower side) means a surface (or direction) adjacent to the rear surface RS. The cross-section means a surface parallel to the thickness direction DR3, and the plane means a surface orthogonal to the thickness direction DR3. The plane means a surface parallel to the plane defined by the first direction axis DR1 and the second direction axis DR2.

The directions indicated by the first to third direction axes DR1, DR2 and DR3, explained in the description have relative concept and may be transformed into other directions. In addition, the directions indicated by the first to third direction axes DR1, DR2 and DR3 may be explained as first to third directions, and the same reference symbols may be used, respectively.

The display device DD may be divided into a folding area FA1 and non-folding areas NFA1 and NFA2. In addition, in the display device DD, multiple non-folding areas NFA1 and NFA2 may be defined. A first non-folding area NFA1 and a second non-folding area NFA2 may be separated with the folding area FA1 therebetween.

In FIG. 1 to FIG. 2B, a display device DD including one folding area FA1 is shown, but this is an illustration, and multiple folding areas may be defined in the display device DD. In addition, the display device DD may be folded with respect to multiple folding axes to be folded so that portions of the display surface FS may face, and the number of the folding axes and consequently the number of the non-folding areas are not limited to any one embodiment.

Referring to FIG. 2A and FIG. 2B, the display device DD may be folded with respect to a first folding axis FX1. The first folding axis FX1 shown in FIG. 2A and FIG. 2B may be an imaginary axis extended in the first direction DR1, and the first folding axis FX1 may be in parallel to the longitudinal direction of the display device DD. However, this is only an embodiment, and the extended direction of the first folding axis FX1 is not limited to the first direction DR1.

The first folding axis FX1 may be extended on the display surface FS along the first direction axis DR1 or extended on the rear surface RS along the first direction axis DR1. Referring to FIG. 2A, a first non-folding area NFA1 and a second non-folding area NFA2 may face to each other and may be inner-folded not to expose the display surface FS of the display DD outside. Referring to FIG. 2B, the display device DD may be folded with respect to the first folding axis FX1 into an outer-folding state in which an area overlapping with the first non-folding area NFA1 and the other area overlapping with the second non-folding area NFA2 of the rear surface RS face to each other.

Figure 3:
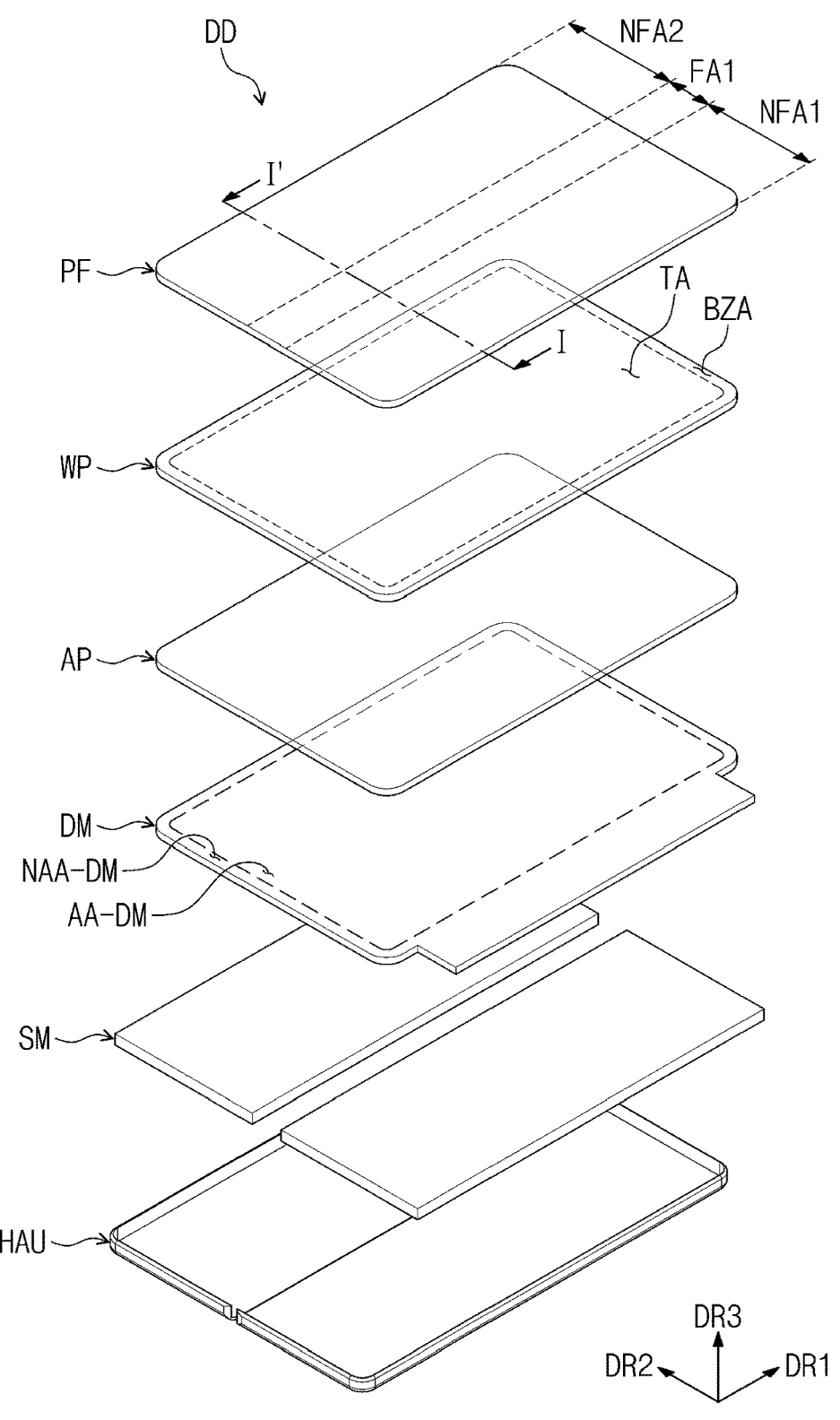
FIG. 3 is an exploded perspective view showing a display device according to an embodiment.

FIG. 3 is an exploded perspective view of the display device DD according to an embodiment. Referring to FIG. 3, the display device DD may include a display module DM, a window WP disposed on the display module DM, and an adhesive member AP disposed between the display module DM and the window WP. In addition, the display device DD may further include a support member SM disposed under the display module DM, a protection layer PF disposed on the window WP, and a housing HAU receiving the display module DM, the support member SM, or the like.

The housing HAU may include a material having relatively high rigidity. In an embodiment, for example, the housing HAU may include multiple frames and/or plates composed of glass, plastics or metals. The housing HAU may provide a certain receiving space. The display module DM may be received in the receiving space for protection from external impact.

The support member SM may include a metal material and a polymer material. In an embodiment, for example, the support member SM may be formed by including stainless steel, aluminum or alloys thereof. In addition, differently, the support member SM may be formed using carbon fiber reinforced plastic ("CFRP"), or the like. However, an embodiment of the invention is not limited thereto, and the support member SM may include a nonmetal material, plastic, glass fiber reinforced plastic or glass.

Though not shown, the display device DD may further include a cushion layer, a shield layer, or the like disposed under the support member SM. The cushion layer may include elastomer such as sponge, foamed foam, and a urethane resin. The shield layer may be an electromagnetic wave shield layer or a heat dissipating layer.

The display module DM may be activated by electrical signals. The display module DM may be activated to display images IM (FIG. 1) on the display area DA (FIG. 1) of the display device DD. On the display module DM, an active area AA-DM and a surrounding area NAA-DM may be defined. The active area AA-DM may be an area activated by electrical signals. The surrounding area NAA-DM may be an area positioned adjacent to at least one side of the active area AA-DM. In the surrounding area NAA-DM, circuits or wirings for driving the active area AA-DM may be disposed.

An adhesive member AP may be disposed on the display module DM. The display module DM and the window WP may be combined by the adhesive member AP. The adhesive member AP may be optically clear. The adhesive member AP of an embodiment may include a polymer derived from the resin composition RC (FIGS. 5A and 6A) of an embodiment. The adhesive member AP may be formed from the resin composition RC (FIGS. 5A and 6A) of an embodiment. The adhesive member AP formed from the resin composition RC (FIGS. 5A and 6A) of an embodiment may show excellent adhesion reliability. In an embodiment, the display device DD including the adhesive member AP formed from the resin composition RC (FIGS. 5A and 6A) may show excellent reliability in an operation state such as folding.

The window WP may include a glass substrate. The window WP may protect the display module DM, or the like. Images IM (FIG. 1) produced at the display module DM may pass through the window WP and be provided to a user. In an embodiment, for example, the window WP may include ultra thin glass ("UTG").

The window WP may include a transmission area TA and a bezel area BZA. The transmission area TA may be overlapped with at least a portion of the active area AA-DM of the display module DM. The transmission area TA may be an optically transparent area. Images IM (FIG. 1) may be provided through the transmission area TA to a user.

The bezel area BZA may be an area having relatively low light transmittance in contrast to the transmission area TA. The bezel area BZA may define the shape of the transmission area TA. The bezel area BZA may be adjacent to the transmission area TA and surround the transmission area TA.

The bezel area BZA may have certain color. The bezel area BZA may cover the surrounding area NAA-DM of the display module DM and block the surrounding area NAA-DM from being recognized by the outside. However, an embodiment of the invention is not limited thereto, and the bezel area BZA may be disposed adjacent to only one side of the transmission area TA, or at least a portion thereof may be omitted.

The protection layer PF may be a functional layer protecting one surface (for example, top surface) of the window WP. The protection layer PF may include a fingerprint preventing coating material, a hard coating material, an antistatic agent, or the like. Though not shown, an auxiliary adhesive layer may be disposed between the window WP and the protection layer PF. Different from the drawing, the protection layer PF may be omitted.

Figure 4:
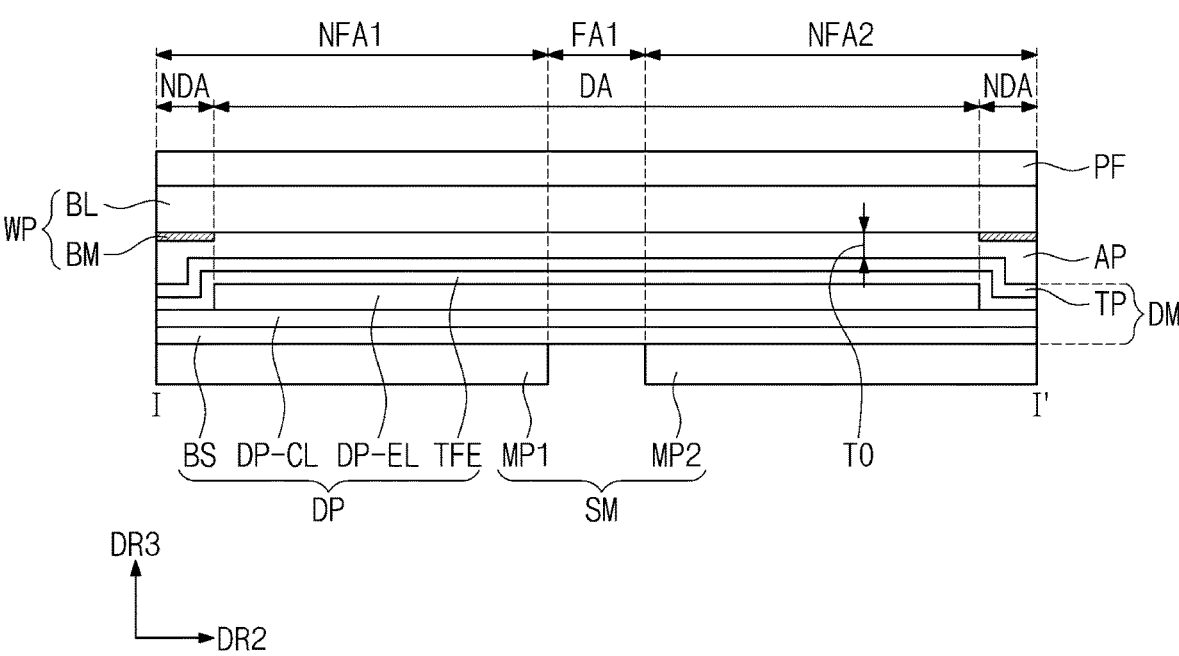
FIG. 4 is a cross-sectional view showing a part corresponding to line I-I' in FIG. 3.

FIG. 4 is a cross-sectional view showing a part corresponding to line I-I' in FIG. 3. FIG. 4 may be a cross-sectional view showing the display device DD according to an embodiment. In FIG. 4, the housing HAU is omitted for the convenience of explanation, and a support member SM, a display module DM, an adhesive member AP, a window WP and a protection layer PF are shown.

Referring to FIG. 4, the support member SM may include a first support part MP1 overlapping with the first non-folding area NFA1 and a second support part MP2 overlapping with the second non-folding area NFA2. The first support part MP1 and the second support part MP2 may be separated from the folding area FA1. The first support part MP1 and the second support part MP2 may not be overlapped with the folding area FA1. Different from the drawing, at least a portion of the first support part MP1 and at least a portion of the second support part MP2 may be overlapped with the folding area FA1.

The display module DM may include a display panel DP and an input sensing part TP disposed on the display panel DP. The display panel DP may include a base substrate BS, a circuit layer DP-CL disposed on the base substrate BS, a display element layer DP-EL disposed on the circuit layer DP-CL, and an encapsulation layer TFE covering the display device layer DP-CL. Between the display panel DP and the window WP, an adhesive member AP may be disposed.

The configuration of the display panel DP, shown in FIG. 4 is an illustration, and the configuration of the display panel DP is not limited thereto. In an embodiment, for example, the display panel DP may include a liquid crystal display device, and in this case, the encapsulation layer TFE may be omitted.

The base substrate BS may provide a base surface on which the circuit layer DP-CL is disposed. The base substrate BS may be a flexible substrate of which bending, folding, rolling, or the like is possible. The base substrate BS may be a glass substrate, a metal substrate, or a polymer substrate. However, an embodiment of the invention is not limited thereto, and the base substrate BS may include an inorganic layer, an organic layer or a composite material layer.

The circuit layer DP-CL may include an insulating layer, a semiconductor pattern, a conductive pattern, and a signal line. In an embodiment, for example, the circuit layer DP-CL may include a switching transistor and a driving transistor for driving the light emitting elements (not shown) of the display element layer DP-EL.

The display element layer DP-EL may include a light emitting element emitting light (not shown). In an embodiment, for example, the light emitting element (not shown) may include an organic light emitting material, an inorganic light emitting material, an organic-inorganic light emitting material, a quantum dot, a quantum rod, a micro LED, or a nano LED.

The encapsulation layer TFE may be disposed on display element layer DP-EL. The encapsulation layer TFE may protect the display element layer DP-EL from foreign materials such as humidity, oxygen, and/or dust particles. The encapsulation layer TFE may include at least one inorganic layer. In addition, the encapsulation layer TFE may include at least one organic layer and at least one inorganic layer. In an embodiment, for example, the encapsulation layer TFE may include an inorganic layer, an organic layer and an inorganic layer, laminated in order.

The input sensing part TP may be disposed on the display panel DP. In an embodiment, for example, the input sensing part TP may be disposed directly on the encapsulation layer TFE of the display panel DP. The input sensing part TP may sense an external pressure to change into a certain input signal and provide the display panel DP with the input signal. In an embodiment, for example, in the display device DD of an embodiment, the input sensing part TP may be a touch sensing part sensing a touch. The input sensing part TP may recognize the direct touch of a user, the indirect touch of a user, the direct touch of an object, the indirect touch of an object, or the like.

The input sensing part TP may sense at least one among the position of the touch or the intensity (pressure) of the touch, applied from the outside. In an embodiment, the input sensing part TP may have various structures or may be constituted using various materials, without limitation. The input sensing part TP may include multiple sensing electrodes (not shown) for sensing the pressure from the outside. The sensing electrodes (not shown) may sense the pressure from the outside by an electrostatic capacitance manner. The display panel DP may receive input signals from the input sensing part TP and may produce images corresponding to the input signals.

The window WP may include a base layer BL and a print layer BM. The base layer BL may be a glass substrate. Otherwise, the base layer BL may be a plastic substrate. In an embodiment, for example, the base layer BL may be formed by using polyimide, polyacrylate, polymethylmethacrylate, polycarbonate, polyethylene naphthalate, polyvinylidene chloride, polyvinylidene difluoride, polystyrene, an ethylene-vinyl alcohol copolymer, or combinations thereof.

The print layer BM may be disposed on one surface of the base layer BL. The print layer BM may be provided on the bottom surface of the base layer BL adjacent to the display module DM. The print layer BM may be disposed at an edge area of the base layer BL. The print layer BM may be an ink printed layer. In addition, the print layer BM may be a layer formed by including a pigment or a dye. In the window WP, the bezel area BZA may be a part where the print layer BM is provided.

The thickness TO of the adhesive member AP may be about 50 micrometers (μm) to about 200 μm. In an embodiment, for example, the thickness TO of the adhesive member AP may be about 50 μm to about 100 μm. However, this is an embodiment, and the thickness T0 of the adhesive member AP is not limited thereto.

In an embodiment, the adhesive member AP may have a 180° peel strength of about 300 gf/25 mm to about 1500 gf/25 mm at room temperature with respect to a glass substrate. In the description, the "room temperature" means a temperature of about 20 degrees in Celsius (° C.) to about 30° C. An adhesive member having a 180° peel strength of less than about 300 gf/25 mm at room temperature with respect to a glass substrate has low adhesiveness and is peeled off from an object (for example, a display module and/or window). An adhesive member having a 180° peel strength of greater than about 1500 gf/25 mm with respect to a glass substrate is unavailable of folding and unfolding. Differently, the adhesive member AP of an embodiment has a 180° peel strength of about 300 gf/25 mm to about 1500 gf/25 mm at room temperature with respect to a glass substrate and may show excellent adhesion reliability and excellent folding reliability. The display device DD including the adhesive member AP of an embodiment may show excellent reliability in an operation state such as folding.

Figure 5A:
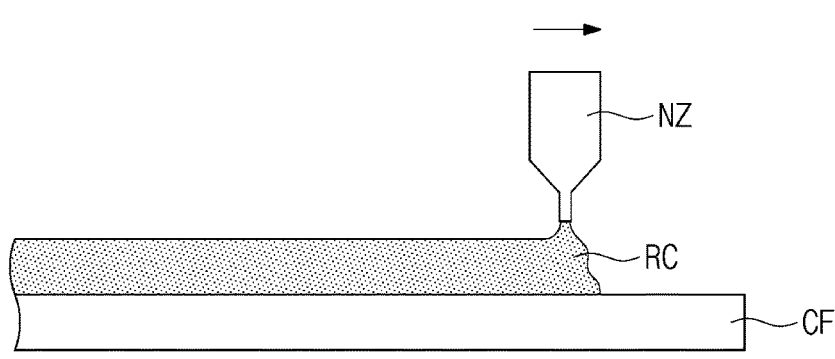
FIG. 5A is a diagram schematically showing a method of forming an adhesive member of an embodiment.
Figure 5B:
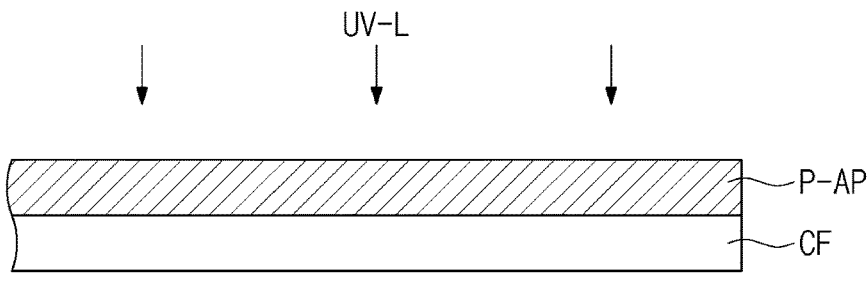
FIG. 5B is a diagram schematically showing a method of forming an adhesive member of an embodiment.
Figure 5C:
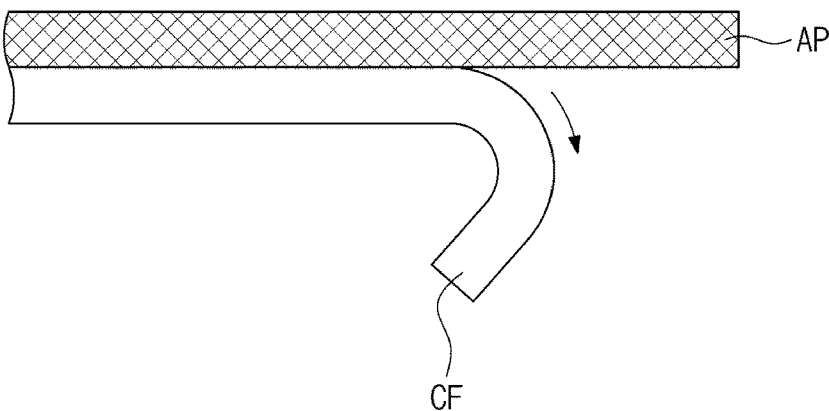
FIG. 5C is a diagram schematically showing a method of forming an adhesive member of an embodiment.

FIG. 5A to FIG. 5C schematically show steps for forming an adhesive member AP from the resin composition RC of an embodiment. The method of forming an adhesive member AP may include a step of providing the resin composition RC on a substrate CF and a step of providing the resin composition RC with light to form an adhesive member AP.

Referring to FIG. 5A, the resin composition RC may be applied on the substrate CF. The resin composition RC may be provided on the substrate CF through a nozzle NZ. In an embodiment, for example, the substrate CF on which the resin composition RC is provided may include polyethylene terephthalate ("PET"). The substrate CF is an optional substrate used for forming the adhesive member AP from the resin composition RC, and anyone may be used as the substrate CF without limitation as long as a cured product of the resin composition RC may be easily detached from the adhesive member AP formed after curing. On one surface of the substrate CF on which the resin composition RC is provided, may undergo release treatment.

The resin composition RC may be provided by an inkjet printing method or a dispensing method. The resin composition RC of an embodiment may have a shear viscosity of about 8 millipascal seconds (mPa s) to about 50 mPa·s, which is measured by a JIS Z8803 method at a temperature of about 25° C. As used herein, the JIS Z8803 method means a standard method for viscosity measurement of liquid published by Japanese Standards Association (JSA). The resin composition RC having a shear viscosity of about 8 mPa·s to about 50 mPa·s, which is measured by a JIS Z8803 method at a temperature of about 25° C., may show stable discharge stability. Accordingly, the resin composition RC may be easily discharged from a device such as a nozzle NZ and may be applied with a uniform amount and a uniform thickness.

A resin composition having a shear viscosity of less than about 8 mPa·s, which is measured by a JIS Z8803 method at a temperature of about 25° C., induces the flow of the resin composition. The "flow" means the flowing phenomenon deviated from a member of the resin composition to be provided. A resin composition having a shear viscosity of greater than about 50 mPa·s, which is measured by a JIS Z8803 method at a temperature of about 25° C., is inappropriate to apply by an inkjet printing method and a dispensing method. The resin composition having a shear viscosity of greater than about 50 mPa·s, which is measured by a JIS Z8803 method at a temperature of about 25° C., is uneasy to be discharged from a device such as a nozzle NZ and could not be applied with a uniform amount and/or a uniform thickness.

The resin composition RC of an embodiment may include at least one (meth)acrylate oligomer, at least one (meth) acrylate monomer, at least one urethane (meth)acrylate oligomer, and at least one photoinitiator. In the description, the (meth)acryloyl group means an acryloyl group or a methacryloyl group, and the (meth)acryl means acryl or methacryl.

The resin composition RC of an embodiment may include at least one (meth)acrylate oligomer having a glass transition temperature (Tg) of about 110° C. to about 140° C. An adhesive member formed from a resin composition including a (meth)acrylate oligomer having a glass transition temperature of less than about 110° C. or greater than about 140° C. may have low adhesiveness and may be peeled off from an object. Differently, the adhesive member AP formed from the resin composition RC including at least one (meth) acrylate oligomer having a glass transition temperature of about 110° ° C. to about 140° C. may satisfy the above-described 180° peel strength. The adhesive member AP of an embodiment may have a 180° peel strength of about 300 gf/25 mm to about 1500 gf/25 mm at room temperature with respect to a glass substrate. Accordingly, the adhesive member AP including a polymer derived from the resin composition RC of an embodiment may show excellent adhesion reliability.

With respect to the total weight of the resin composition RC, the weight of the (meth)acrylate oligomer may be about 1 percentage by weight (wt %) to about 20 wt %. An adhesive member formed from a resin composition including less than about 1 wt % of the (meth)acrylate oligomer with respect to the total weight of the resin composition may have low adhesiveness and may be peeled off from an object. A resin composition including greater than about 20 wt % of the (meth)acrylate oligomer with respect to the total weight of the resin composition may have a very high shear viscosity and may be difficult to be discharged from a nozzle NZ. The resin composition including greater than about 20 wt % of the (meth)acrylate oligomer with respect to the total weight of the resin composition may have a very high shear viscosity and may be inappropriate to apply by an inkjet printing method or a dispensing method.

In an embodiment, the resin composition RC including about 1 wt % to about 20 wt % of the (meth)acrylate oligomer with respect to the total weight of the resin composition may be easily discharged from a nozzle NZ and may be applied with a uniform amount and/or a uniform thickness. In addition, the adhesive member AP formed from the resin composition RC including about 1 wt % to about 20 wt % of the (meth)acrylate oligomer with respect to the total weight of the resin composition may satisfy the 180° peel strength according to an embodiment. The adhesive member AP of an embodiment may have a 180° peel strength of about 300 gf/25 mm to about 1500 gf/25 mm at room temperature with respect to a glass substrate.

The weight-average molecular weight (Mw) of the (meth) acrylate oligomer may be about 4000 to about 20,000. A (meth)acrylate oligomer having a weight-average molecular weight less than about 4000 may have a glass transition temperature of greater than about 140° C. Accordingly, an adhesive member formed from a resin composition including the (meth)acrylate oligomer having a weight-average molecular weight of less than about 4000 may have low adhesiveness. A (meth)acrylate oligomer having a weight-average molecular weight greater than about 20,000 may not satisfy the glass transition temperature according to an embodiment. A resin composition including the (meth) acrylate oligomer having a weight-average molecular weight greater than about 20,000 may not be easily discharged from a nozzle NZ and may not be applied with a uniform amount and/or a uniform thickness. Differently, in an embodiment, the (meth)acrylate oligomer having the weight-average molecular weight (Mw) of about 4000 to about 20,000 may have a glass transition temperature of about 110° C. to about 140° ° C. In addition, the resin composition RC including the (meth)acrylate oligomer having the weight-average molecular weight (Mw) of about 4000 to about 20,000 may be easily discharged from the nozzle NZ and may be applied with a uniform amount and/or a uniform thickness.

In the resin composition RC of an embodiment, the (meth)acrylate oligomer may include a copolymer derived from a first monomer and a second monomer which is different from the first monomer. The (meth)acrylate oligomer may include a copolymer composed of a first repeating unit derived from the first monomer and a second repeating unit derived from the second monomer. In an embodiment, for example, the (meth)acrylate oligomer may include a random copolymer composed of the first repeating unit derived from the first monomer and the second repeating unit derived from the second monomer. The polydispersity index ("PDI") of the copolymer included in the (meth) acrylate oligomer according to an embodiment may be about 1.2 to about 1.7.

The "polydispersity index" is a value obtained by dividing the weight-average molecular weight ("Mw") by a number-average molecular weight ("Mn"). The large polydispersity index means broad molecular weight distribution from a low molecular weight to a high molecular weight, and the small polydispersity index means narrow molecular weight distribution from a low molecular weight to a high molecular weight.

With respect to the total composition of the (meth)acrylate oligomer, the composition ratio of the first repeating unit and the second repeating unit may be about 5:5 to about 9:1. The "composition ratio" is a ratio between the molar percentage (mol %) of the first repeating unit and the mol % of the second repeating unit with respect to the total mole number of the first repeating unit and the second repeating unit. By optimizing the types of the first monomer and the second monomer, and by optimizing the composition ratio of the first repeating unit and the second repeating unit derived from the first monomer and the second monomer, a (meth) acrylate oligomer satisfying the above-described polydispersity index, weight-average molecular weight and glass transition temperature may be prepared. The resin composition including the (meth)acrylate oligomer satisfying the polydispersity index, weight-average molecular weight and glass transition temperature according to an embodiment may have excellent discharge stability, and the adhesive member AP formed from the resin composition RC may show excellent adhesion reliability.

The (meth)acrylate oligomer including the copolymer having the composition ratio of the first repeating unit and the second repeating unit of about 5:5 to about 9:1 may have a weight-average molecular weight of about 4000 to about 20,000 and a polydispersity index of about 1.2 to about 1.7. The (meth)acrylate oligomer including the copolymer having the composition ratio of the first repeating unit and the second repeating unit of about 5:5 to about 9:1 may have a glass transition temperature of about 110° C. to about 140° C.

Each of the first monomer and the second monomer may include any one among (meth)acrylic acid methyl, (meth) acrylic acid isobornyl, (meth)acrylic acid dicyclopentanyl, (meth)acrylic acid cyclohexyl, and (meth)acrylic acid adamantyl. In an embodiment, for example, the first monomer may include (meth)acrylic acid methyl, and the second monomer may include (meth)acrylic acid isobornyl.

The resin composition RC of an embodiment may include at least one (meth)acrylate monomer including a (meth) acryloyl group. In an embodiment, for example, in the resin composition RC, the (meth)acrylate monomer may include at least one among an alicyclic (meth)acrylate, a hydroxyl group-containing (meth)acrylate, an alkyl (meth)acrylate, and an aromatic (meth)acrylate. The (meth)acrylate monomer may include at least one among 4-hydroxy butyl acrylate), 2-ethylhexyl acrylate, tetrahydrofurfuryl acrylate, and 2-ethylhexyl-diglycol acrylate.

With respect to the total weight of the resin composition RC, the weight of the (meth)acrylate monomer may be about 40 wt % to about 90 wt %. The resin composition RC may include one (meth)acrylate monomer or multiple (meth) acrylate monomers. In case where the resin composition RC includes multiple (meth)acrylate monomers, the sum of the weight of the multiple (meth)acrylate monomers may be about 40 wt % to about 90 wt % with respect to the total weight of the resin composition RC. A resin composition including the (meth)acrylate monomer less than about 40 wt % with respect to the total weight of the resin composition may have a high viscosity and induce the flowing of the resin composition. An adhesive member formed from the resin composition including the (meth)acrylate monomer greater than about 90 wt % with respect to the total weight of the resin composition may have low adhesiveness and serve uneasy repeating of folding and unfolding. Differently, the resin composition RC including the (meth)acrylate monomer of about 40 wt % to about 90 wt % with respect to the total weight of the resin composition RC may produce the adhesive member AP having excellent adhesion reliability and excellent folding reliability.

The resin composition RC of an embodiment may include at least one urethane (meth)acrylate oligomer. The weight-average molecular weight of the urethane (meth)acrylate oligomer may be about 5000 to about 40,000. The urethane (meth)acrylate oligomer having the weight-average molecular weight of about 5000 to about 40,000 is included in the resin composition RC in an oligomer state having a relatively high degree of polymerization, and may maintain the high degree of polymerization even after photocuring, thereby forming the adhesive member AP having excellent adhesion reliability.

In an embodiment, for example, the weight of the urethane (meth)acrylate oligomer may be about 10 wt % to about 15 wt % with respect to the total weight of the resin composition RC. The weight of the urethane (meth)acrylate oligomer may be about 13 wt % with respect to the total weight of the resin composition RC. However, this is only an illustration, and the weight of the urethane (meth)acrylate oligomer is not limited thereto.

The resin composition RC of an embodiment may include at least one photoinitiator. The photoinitiator may include a radical polymerization initiator. If the resin composition RC includes multiple photoinitiators, different photoinitiators may be activated by ultraviolet light having different central wavelengths.

In an embodiment, for example, the photoinitiator may include at least one among 2,2-dimethoxy-1,2-diphenyle-than-1-one, 1-hydroxy cyclohexyl-phenylketone), 2-hydroxy-2-methyl-1-phenyl-1-propanone, 2-hydroxy-1-[4-(2-hydroxyethoxy)phenyl]-2-methyl-1-propanone), and 2-hydroxy-1-{4-[4-(2-hydroxy-2-methyl-propionyl)-ben-zyl]-phenyl}-2-methylpropan-1-one.

In addition, the photoinitiator may include at least one among 2-methyl-1[4-(methylthio)phenyl]-2-morpholino-propan-1-one, 2-benzyl-2-dimethylamino-1-(4-morpholino-phenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate), phenylbis(2,4,6-trimethylbenzoyl)phosphine oxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium(IV).

Referring to FIG. 5B, to a preliminary adhesive member P-AP formed by applying the resin composition RC to a certain thickness, ultraviolet UV-L may be irradiated. In FIG. 5B, ultraviolet UV-L is directly irradiated to the pre-liminary adhesive member P-AP, but an embodiment of the invention is not limited thereto. On the preliminary adhesive member P-AP, a carrier film (not shown) may be disposed, and the carrier film (not shown) may cover the preliminary adhesive member P-AP during a curing process. The carrier film (not shown) may transmit the ultraviolet UV-L.

The total dosage of light provided for forming the adhe-sive member AP from the resin composition RC may be about 1000 millijoules per square centimeters (mJ/cm$^2$) or less or about 600 mJ/cm$^2$ or less. The ultraviolet UV-L may be irradiated to the preliminary adhesive member P-AP so that the total dosage of the ultraviolet UV-L may be about 1000 mJ/cm$^2$ or less or about 600 mJ/cm$^2$ or less. Generally, the total dosage of light provided for forming an adhesive member from a resin composition may be about 4000 mJ/cm$^2$ or more. The resin composition RC of an embodi-ment may show excellent forming efficiency with the total dosage of light provided for forming the adhesive member AP of about 1000 mJ/cm$^2$ or less.

The ultraviolet UV-L may be provided on the preliminary adhesive member P-AP in the presence of oxygen. The adhesive member AP of an embodiment may be formed by curing the resin composition RC of an embodiment in the presence of oxygen. The adhesive member AP formed by curing the resin composition RC of an embodiment in the presence of oxygen may have a 180° peel strength of about 300 gf/25 mm to about 1500 gf/25 mm at room temperature with respect to a glass substrate. If a general curable resin composition is cured in the presence of oxygen in the air, the polymerization reaction of the resin composition may be inhibited by oxygen. Accordingly, an adhesive member formed by curing the resin composition in the presence of oxygen has low adhesiveness. Even through the resin com-position RC of an embodiment is cured in the presence of oxygen, the adhesive member AP of an embodiment, having excellent adhesion reliability may be formed.

In FIG. 5C, the detaching of the adhesive member AP formed by providing ultraviolet UV-L to the preliminary adhesive member P-AP from a substrate CF is shown. The detached adhesive member AP may be provided on one surface of the window (FIG. 4) or on one surface of the display module DM (FIG. 4). One surface of the adhesive member AP may be laminated on one surface of the window WP (FIG. 4) or on one surface of the display module DM (FIG. 4), and to the remaining surface of the adhesive member AP, one surface of the display module DM or one surface of the window WP, not attached, may be attached.

In order to form the adhesive member AP from the resin composition RC, the ultraviolet UV-L may be provided once, or two or more times. In an embodiment, for example, if the ultraviolet UV-L is provided two times for forming the adhesive member AP from the resin composition RC, the ultraviolet UV-L may be provided to the resin composition RC applied for pseudo curing, and the ultraviolet UV-L is provided to the pseudo cured resin composition for final curing. Through the final curing of the resin composition RC, the adhesive member AP may be formed.

Figure 6A:
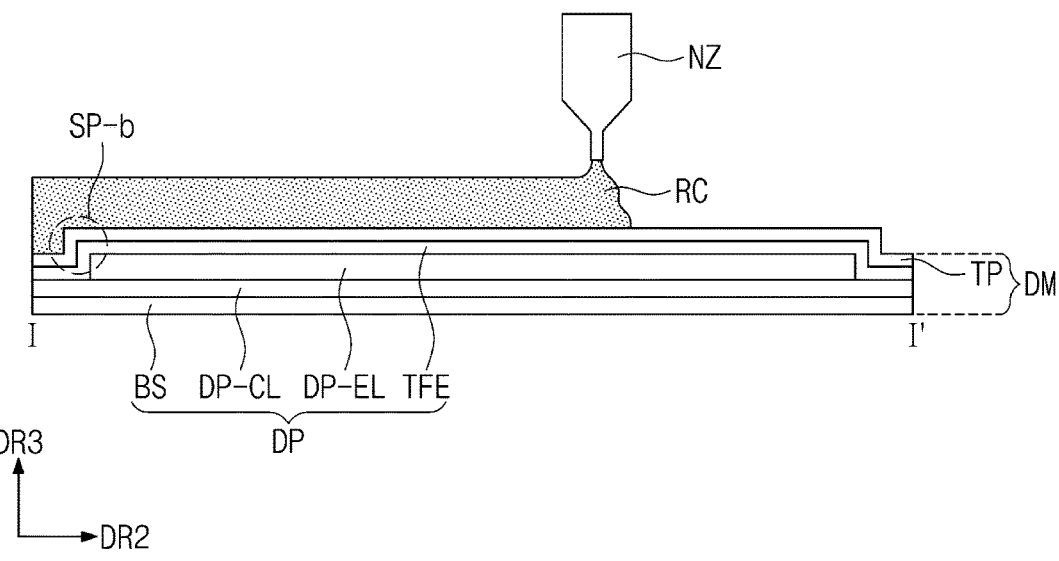
FIG. 6A is a diagram schematically showing a method of forming an adhesive member of another embodiment.
Figure 6B:
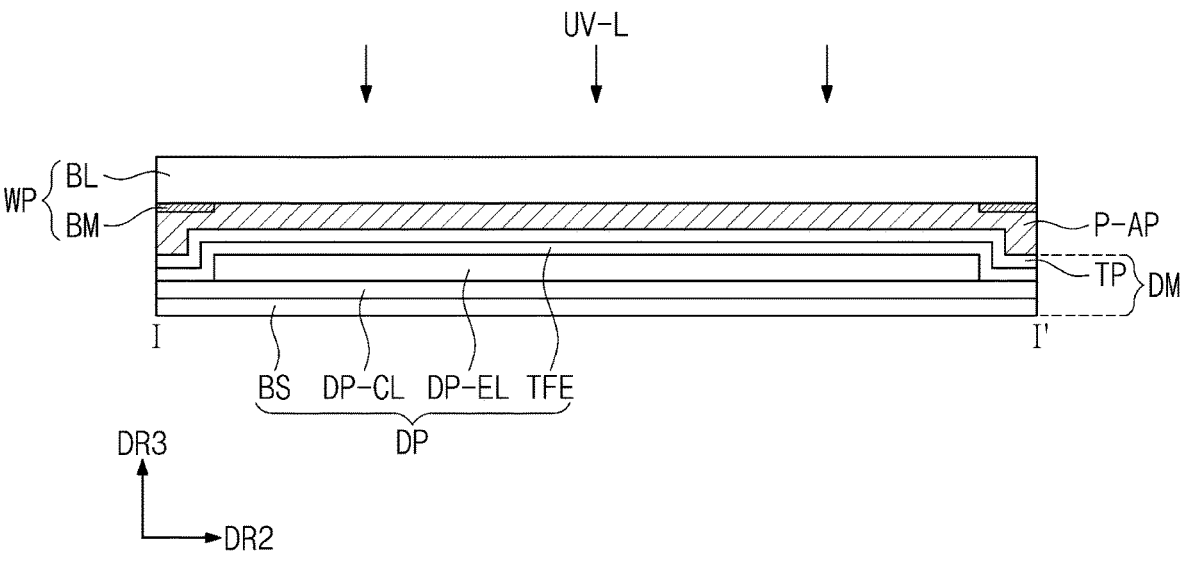
FIG. 6B is a diagram schematically showing a method of forming an adhesive member of another embodiment.

FIG. 6A and FIG. 6B schematically show the steps of the method of forming the adhesive member AP which is formed by a method different from the method of forming the adhesive member AP explained referring to FIG. 5A to FIG. 5C, and included in the display device DD. In the explanation on FIG. 6A and FIG. 6B, overlapping contents as those explained referring to FIG. 1 to FIG. 5C will not be explained again, and different features will be explained mainly.

The resin composition RC may be provided directly on one surface of the display module DM or on one surface of the window WP. In FIG. 6A, the resin composition RC is provided directly on one surface of the display module DM. The resin composition RC having a shear viscosity, of about 8 mPa·s to about 50 mPa·s, which is measured by a JIS Z8803 method at a temperature of about 25° C., may be provided to cover a step SP-b portion in the display module DM.

Referring to FIG. 6B, a window WP may be provided on the preliminary adhesive member P-AP formed by applying the resin composition RC to a certain thickness. Then, ultraviolet UV-L may be provided on the preliminary adhe-sive member P-AP. The ultraviolet UV-L may pass through the window WP and be provided on the preliminary adhe-sive member P-AP. The preliminary adhesive member P-AP may be cured to form an adhesive member AP (FIG. 4). Differently, ultraviolet UV-L may be irradiated directly on the preliminary adhesive member P-AP to form the adhesive member AP (FIG. 4). On the adhesive member AP (FIG. 4) formed, the window WP may be provided.

The resin composition RC of an embodiment may include at least one (meth)acrylate oligomer having a glass transition temperature of about 110° C. to about 140° C., at least one (meth)acrylate monomer, at least one urethane (meth)acry-late oligomer, and at least one photoinitiator. The resin composition RC of an embodiment may have a shear viscosity of about 8 mPa·s to about 50 mPa·s, which is measured by a JIS Z8803 method at a temperature of about 25° C. Accordingly, the resin composition RC of an embodi-ment may be provided by an inkjet printing method or a dispensing method, and an adhesive member AP suitable for members having various shapes, constituting the display device DD may be formed. The adhesive member AP formed from the resin composition RC of an embodiment may have a 180° peel strength of about 300 gf/25 mm to about 1500 gf/25 mm at room temperature with respect to a glass substrate. Accordingly, the display device DD includ-ing the adhesive member AP of an embodiment may show excellent reliability during operation such as folding.

Figure 7:
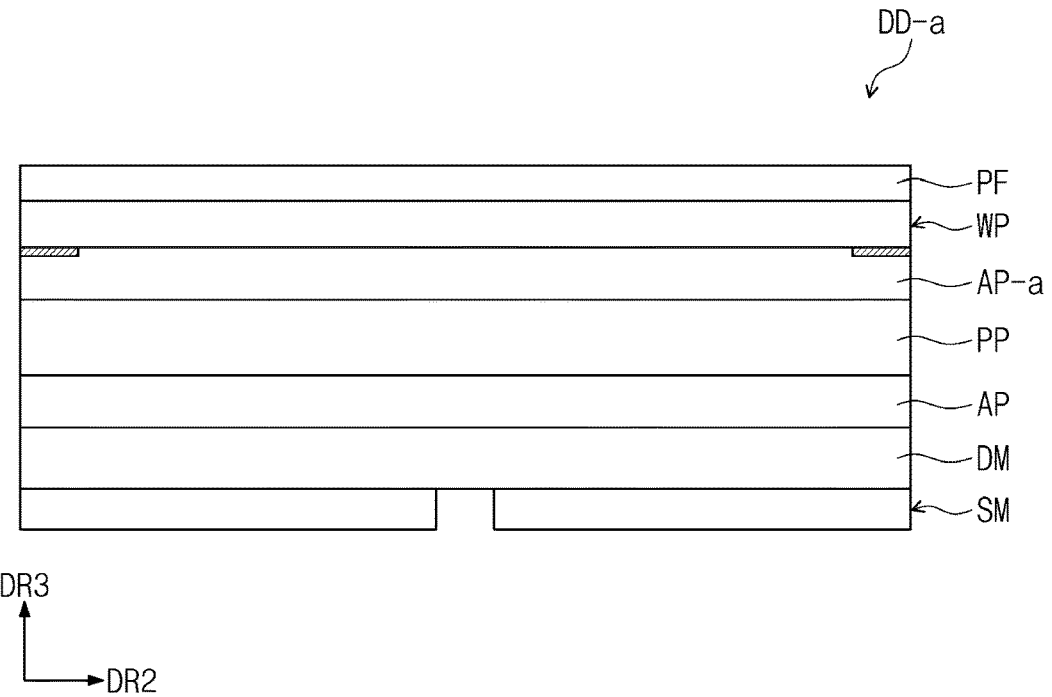
FIG. 7 is a cross-sectional view showing a display device according to an embodiment.

FIG. 7 is a cross-sectional view showing a display device of an embodiment. Hereinafter, the overlapping contents with those explained referring to FIG. 1 to FIG. 6C will not be explained again on the display device shown in FIG. 7, and different features will be explained mainly.

Compared to the display device DD explained referring to FIG. 3 and FIG. 4, a display device DD-a shown in FIG. 7 may further include a light controlling layer PP and an optical adhesive layer AP-a. The display device DD-a of an embodiment may further include a light controlling layer PP disposed between the adhesive member AP and the window WP, and an optical adhesive layer AP-a disposed between the light controlling layer PP and the window WP.

The light controlling layer PP may be disposed on the display panel DP and control reflecting light at the display panel DP by external light. The light controlling layer PP may include, for example, a polarization plate or a color filter layer.

The optical adhesive layer AP-a may be formed from the resin composition RC according to an embodiment. The optical adhesive layer AP-a may include a polymer derived from the resin composition RC according to an embodiment. The optical adhesive layer AP-a including the polymer derived from the resin composition RC may have a 180° peel strength of about 300 gf/25 mm to about 1500 gf/25 mm at room temperature with respect to a glass substrate. The optical adhesive layer AP-a including the polymer derived from the resin composition RC according to an embodiment may show excellent adhesion reliability.

Figure 8:
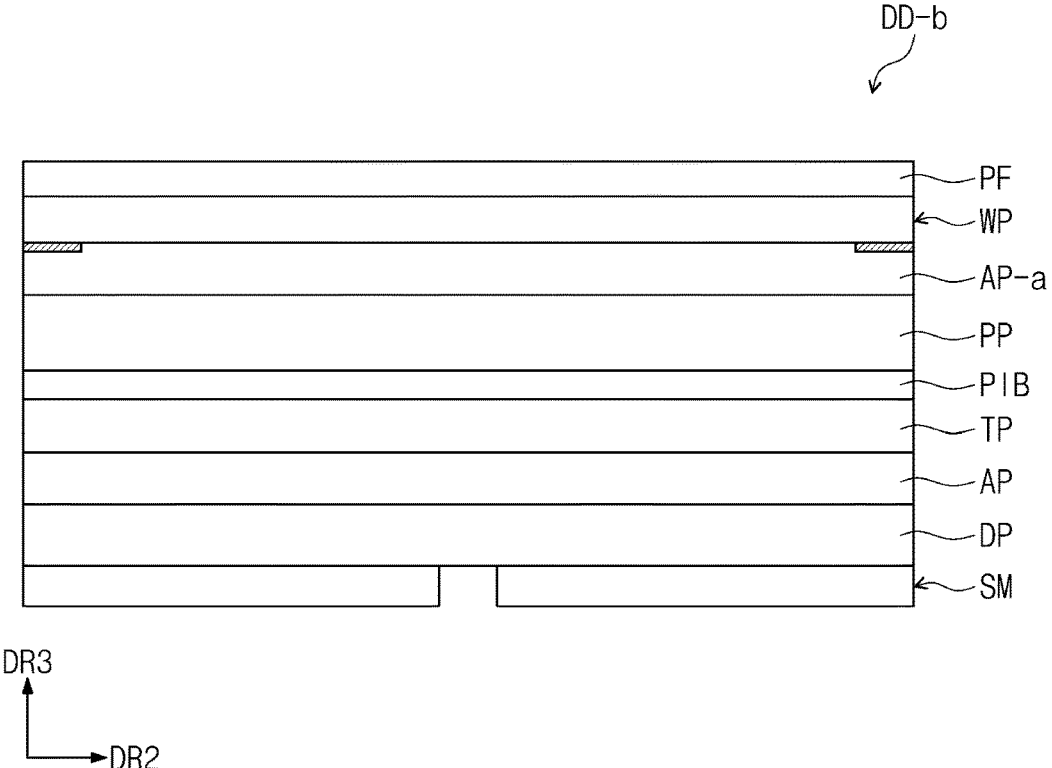
FIG. 8 is a cross-sectional view showing a display device according to an embodiment.

FIG. 8 is a cross-sectional view showing a display device of an embodiment. Hereinafter, the overlapping contents with those explained referring to FIG. 1 to FIG. 7 will not be explained again on the display device of an embodiment, shown in FIG. 8, and different features will be explained mainly.

Compared to the display device DD explained referring to FIG. 3 and FIG. 4, a display device DD-b shown in FIG. 8 may further include a light controlling layer PP, an optical adhesive layer AP-a, and an interlayer adhesive layer PIB. The display device DD-b of an embodiment, shown in FIG. 8 may further include a light controlling layer PP disposed between the adhesive member AP and the window WP, and an optical adhesive layer AP-a disposed between the light controlling layer PP and the window WP, as in the display device DD-a of an embodiment, shown in FIG. 7.

In the display device DD-b, the adhesive member AP may be provided between the display panel DP and an input sensing part TP. That is, the input sensing part TP may not be disposed directly on the display panel DP, but the display panel DP and the input sensing part TP may be combined by the adhesive member AP. In an embodiment, for example, the adhesive member AP may be disposed between the encapsulation layer TFE (FIG. 4) of the display panel DP and the input sensing part TP.

Under the light controlling layer PP, an interlayer adhesive layer PIB may be provided. The interlayer adhesive layer PIB may be disposed between the input sensing part TP and the light controlling layer PP and may be formed using an adhesive material having excellent prevention of moisture permeation. In an embodiment, for example, the interlayer adhesive layer PIB may be formed by including polyisobutylene. The interlayer adhesive layer PIB may be disposed on the input sensing part TP and prevent the corrosion of the sensing electrodes of the input sensing part TP. The display device DD-b of an embodiment may include the optical adhesive layer AP-a and the adhesive member AP formed from the resin composition RC according to an embodiment, and the optical adhesive layer AP-a and the adhesive member AP may show excellent adhesion reliability. The display devices DD-a and DD-b, including the optical adhesive layer AP-a and the adhesive member AP may show excellent reliability during operation such as folding.

Hereinafter, referring to embodiments and comparative embodiments, the adhesive member formed from the resin composition and the display device according to an embodiment of the invention will be explained in particular. In addition, the embodiments below are illustrations to assist the understanding of the invention, but the scope of the invention is not limited thereto.

EXAMPLES

1. Synthesis of (meth)acrylate Oligomer (Meth)acrylate oligomers S-1 to S-4 provided as the resin compositions of the Examples and Comparative Examples were synthesized by the methods explained below. (Meth) acrylate oligomers S-1 and S-2 are the (meth)acrylate oligomers of the Examples, and (meth)acrylate oligomers S-3 and S-4 are the (meth)acrylate oligomers of the Comparative Examples.

In the synthetic examples below, molecular weights and polydispersity indexes were measured using a gel permeation chromatography (GPC) analyzer of HLC-8420GPC, which is a product of TOSOH corporation. TSKgel SUPER HZM-N was used as a measurement column, and number-average molecular weight ("Mn") values and polydispersity index values were obtained by converting based on standard polystyrene ("PS") on a size exclusion chromatography ("SEC") curve detected by a refractive index ("RI") detector.

The composition ratios of copolymers were computed from the integration ratio of signals measured from each monomer component on a proton NMR spectrum measured by a nuclear magnetic resonance ("NMR") analyzer of "AVANCE III 300M", which is a product of Bruker. In addition, deuterated chloroform (a product of KANTO CHEMICAL CO., INC.) was used as a deuterated solvent for measurement.

The glass transition temperature (Tg) of copolymers was measured under the temperature elevation conditions of about 10 kelvins per minutes (K/min) using a differential scanning calorimetry (DSC) of Photo-DSC 204 Phoenix, which is a product of NETZSCH.

Synthesis of (meth)acrylate Oligomer S-1

To a round-bottom flask equipped with a cooling tube, a dropping funnel, a nitrogen introduction tube, and a magnetic stirrer, 40 milliliters (ml) of butyl acetate was provided and stirred at room temperature for about 30 minutes while bubbling nitrogen to remove oxygen in a solvent. The flask was heated in an oil bath until the inner temperature reached about 90° C. Then, to the dropping funnel, 14.1 grams (g) of methacrylic acid methyl (MMA, a product of Tokyo Chemical Industry Co., Ltd.) and 11.1 g of methacrylic acid isobornyl (IBXMA, a product of Tokyo Chemical Industry Co., Ltd.) were provided as methacrylic acid monomers, 2.2 g of V-601 (a product of FUJIFILM Wako Pure Chemical Corporation) was provided as a thermal polymerization initiator, and 10 ml of butyl acetate was added, which had been homogenized in advance. A stopper was opened, and materials were slowly added dropwisely into the flask for about 1 hour, followed by stirring for about 1 hour to perform polymerization reaction.

Then, 600 ml of a mixture solution of ethanol and distilled water (a volume ratio of about 70:30) was added to a 1000 ml beaker and stirred using the magnetic stirrer. The solution in the flask after the polymerization reaction was added thereto little by little and dropwisely to produce a precipitate. The precipitate was filtered by suction filtration, and washed again with a mixture solvent of ethanol and distilled water, and filtered to remove butyl acetate and unreacted monomers. The precipitate was dried under a reduced pressure to obtain 18 g of a white powder ((meth)acrylate oligomer S-1), which is a copolymer of MMA and IBXMA.

It was confirmed that the (meth)acrylate oligomer S-1 had a weight-average molecular weight of about 4,500 and a polydispersity index of about 1.33. It was confirmed that the copolymer of (meth)acrylate oligomer S-1 had a composition ratio of MMA:IBXMA=74.3:25.7 and a glass transition temperature (Tg) of about 118° C.

Synthesis of (meth)acrylate Oligomer S-2

The synthesis of (meth)acrylate oligomer S-2 is different from the synthesis of (meth)acrylate oligomer S-1 in the provision amount of the thermal polymerization initiator.

To a round-bottom flask equipped with a cooling tube, a dropping funnel, a nitrogen introduction tube, and a magnetic stirrer, 40 ml of butyl acetate was provided and stirred at room temperature for about 30 minutes while bubbling nitrogen to remove oxygen in a solvent. The flask was heated in an oil bath until the inner temperature reached about 90° C. Then, to the dropping funnel, 14.1 g of methacrylic acid methyl (MMA, a product of Tokyo Chemical Industry Co., Ltd.) and 11.1 g of methacrylic acid isobornyl (IBXMA, a product of Tokyo Chemical Industry Co., Ltd.) were provided as methacrylic acid monomers, 1.1 g of V-601 (a product of FUJIFILM Wako Pure Chemical Corporation) was provided as a thermal polymerization initiator, and 10 ml of butyl acetate was added, which had been homogenized in advance. A stopper was opened, and materials were slowly added dropwisely into the flask for about 1 hour, followed by stirring for about 1 hour to perform polymerization reaction.

Then, 600 ml of a mixture solution of ethanol and distilled water (a volume ratio of about 70:30) was added to a 1000 ml beaker and stirred using the magnetic stirrer. The solution in the flask after the polymerization reaction was added thereto little by little and dropwisely to produce a precipitate. The precipitate was filtered by suction filtration, and washed again with a mixture solvent of ethanol and distilled water, and filtered to remove butyl acetate and unreacted monomers. The precipitate was dried under a reduced pressure to obtain 20 g of a white powder ((meth)acrylate oligomer S-2), which is a copolymer of MMA and IBXMA.

It was confirmed that (meth)acrylate oligomer S-2 had a weight-average molecular weight of about 6,400 and a polydispersity index of about 1.49. It was confirmed that the copolymer of (meth)acrylate oligomer S-2 had a composition ratio of MMA:IBXMA=76.9:23.1, and a glass transition temperature (Tg) of about 124° C.

Synthesis of (meth)acrylate Oligomer S-3

The synthesis of (meth)acrylate oligomer S-3 is different from the synthesis of (meth)acrylate oligomer S-1 in the provision of one monomer as the methacrylic acid monomer. In addition, the synthesis of (meth)acrylate oligomer S-3 is different from the synthesis of (meth)acrylate oligomer S-1 in the volume ratio of the mixture solution of ethanol and distilled water.

To a round-bottom flask equipped with a cooling tube, a dropping funnel, a nitrogen introduction tube, and a magnetic stirrer, 40 ml of butyl acetate was provided and stirred at room temperature for about 30 minutes while bubbling nitrogen to remove oxygen in a solvent. The flask was heated in an oil bath until the inner temperature reached about 90°

C. Then, to the dropping funnel, 25.2 g of methacrylic acid methyl (MMA, a product of Tokyo Chemical Industry Co., Ltd.) was provided as a methacrylic acid monomer, 2.2 g of V-601 (a product of FUJIFILM Wako Pure Chemical Corporation) was provided as a thermal polymerization initiator, and 10 ml of butyl acetate was added, which had been homogenized in advance. A stopper was opened, and materials were slowly added dropwisely into the flask for about 1 hour, followed by stirring for about 1 hour to perform polymerization reaction.

Then, 600 ml of a mixture solution of ethanol and distilled water (a volume ratio of about 50:50) was added to a 1000 ml beaker and stirred using the magnetic stirrer. The solution in the flask after the polymerization reaction was added thereto little by little and dropwisely to produce a precipitate. The precipitate was filtered by suction filtration, and washed again with a mixture solvent of ethanol and distilled water, and filtered to remove butyl acetate and an unreacted monomer. The precipitate was dried under a reduced pressure to obtain 19 g of a white powder ((meth)acrylate oligomer S-3), which is a polymer of MMA.

It was confirmed that (meth)acrylate oligomer S-3 had a weight-average molecular weight of about 4,500 and a polydispersity index of about 1.36. It was confirmed that (meth)acrylate oligomer S-3 had a glass transition temperature (Tg) of about 100° C.

Synthesis of (meth)acrylate Oligomer S-4

The synthesis of (meth)acrylate oligomer S-4 is different from the synthesis of (meth)acrylate oligomer S-1 in the provision of one monomer as the methacrylic acid monomer and in the provision amount of the thermal polymerization initiator.

To a round-bottom flask equipped with a cooling tube, a dropping funnel, a nitrogen introduction tube, and a magnetic stirrer, 40 ml of butyl acetate was provided and stirred at room temperature for about 30 minutes while bubbling nitrogen to remove oxygen in a solvent. The flask was heated in an oil bath until the inner temperature reached about 90° C. Then, to the dropping funnel, 25.2 g of methacrylic acid isobornyl (IBXMA, a product of Tokyo Chemical Industry Co., Ltd.) was provided as a methacrylic acid monomer, 5.8 g of V-601 (a product of FUJIFILM Wako Pure Chemical Corporation) was provided as a thermal polymerization initiator, and 10 ml of butyl acetate was added, which had been homogenized in advance. A stopper was opened, and materials were slowly added dropwisely into the flask for about 1 hour, followed by stirring for about 1 hour to perform polymerization reaction.

Then, 600 ml of a mixture solution of ethanol and distilled water (a volume ratio of about 70:30) was added to a 1000 ml beaker and stirred using the magnetic stirrer. The solution in the flask after the polymerization reaction was added thereto little by little and dropwisely to produce a precipitate. The precipitate was filtered by suction filtration, and washed again with a mixture solvent of ethanol and distilled water, and filtered to remove butyl acetate and an unreacted monomer. The precipitate was dried under a reduced pressure to obtain 21 g of a white powder ((meth)acrylate oligomer S-4), which is a polymer of IBXMA.

It was confirmed that (meth)acrylate oligomer S-4 had a weight-average molecular weight of about 3,400 and a polydispersity index of about 1.26. It was confirmed that (meth)acrylate oligomer S-4 had a glass transition temperature (Tg) of about 151° C.

2. Preparation of Resin Composition

The resin compositions of the Examples and Comparative Examples were prepared according to the mixing ratios described in Table 1. The materials disclosed in Table 1 in each weight ratio, were provided into a heat-resistant, light-shielding container. After that, stirring was performed at room temperature to prepare the resin compositions of the Examples and Comparative Examples.

UN6304: urethane acrylate (a weight-average molecular weight: about 10000, a product of Negami Chemical Industrial Co., Ltd.)

KE311: hydrogenated rosin ester (a product of Arakawa Chemical Industries, Ltd.)

2. Evaluation of Resin Compositions and Adhesive Members

In Table 2 below, the shear viscosity, the provision of inkjet printing or not, and the 180° peel strength of each of

TABLE 1

| Material | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| (meth)acrylate oligomer | S-1 | 5 | 9 | | | | | | 22 |
| | S-2 | | | 9 | | | | | |
| | S-3 | | | | | 9 | | | |
| | S-4 | | | | | | 9 | | |
| Photoinitiator | Omnirad 819 | 3 | 3 | 3 | 3 | 3 | 3 | 3 | 2 |
| (meth)acrylate monomer | 4-HBA | 6 | 6 | 6 | 7 | 6 | 6 | 6 | 5 |
| | 2-EHA | 50 | 48 | 48 | 52 | 48 | 48 | 48 | 41 |
| | THF-A | 14 | 13 | 13 | 14 | 13 | 13 | 13 | 11 |
| | EHDG-AT | 11 | 10 | 10 | 11 | 10 | 10 | 10 | 9 |
| Urethane (meth)acrylate oligomer | UF-C051 | 3 | 3 | 3 | 3 | 3 | 3 | 3 | 2 |
| | UF-C052 | 3 | 3 | 3 | 3 | 3 | 3 | 3 | 2 |
| | UN6304 | 6 | 6 | 6 | 7 | 6 | 6 | 6 | 5 |
| Tackifier | KE311 | | | | | | | 9 | |

Referring to Table 1, the resin compositions of Examples 1 to 3 include (meth)acrylate oligomer S-1 or S-2, having the glass transition temperature of about 110° C. to about 140° C. The resin compositions of Examples 1 to 3 have the weight of the (meth)acrylate oligomer of about 1 wt % to about 20 wt % with respect to the total weight of the resin composition. The resin compositions of Examples 1 to 3 are the resin compositions according to embodiments and include a (meth)acrylate oligomer satisfying the above-described glass transition temperature and weight.

The resin compositions of Comparative Examples 1 and 4 do not include a (meth)acrylate oligomer. The resin composition of Comparative Example 2 includes (meth)acrylate oligomer S-3 having the glass transition temperature of less than about 110° C. The resin composition of Comparative Example 3 includes (meth)acrylate oligomer S-4 having the glass transition temperature of greater than about 140° C. In addition, in the resin compositions of Comparative Examples 3 and 4, (meth)acrylate oligomers S-3 and S-4 are derived from one monomer. The resin composition of Comparative Example 5 has the weight of the (meth)acrylate oligomer of greater than about 20 wt % with respect to the total weight of the resin composition.

<Data on the Materials in Table 1>

Omnirad 819: phenylbis(2,4,6-trimethylbenzoyl)phosphine oxide (a product of IGM Resins Co.)

4-HBA: 4-hydroxybutyl acrylate (a product of Osaka Organic Chemical Industry Ltd.)

2-EHA: 2-ethylhexyl acrylate (a product of Toagosei Co., Ltd.)

THF-A: tetrahydrofurfuryl acrylate (a product of Kyoeisha Chemical Co., Ltd.)

EHDG-AT: 2-ethylhexyl-diglycol acrylate (a product of Kyoeisha Chemical Co., Ltd.)

UF-C051: urethane acrylate (a weight-average molecular weight: about 35000, a product of Kyoeisha Chemical Co., Ltd.)

UF-C052: urethane acrylate (a weight-average molecular weight: about 10000, a product of Kyoeisha Chemical Co., Ltd.)

the resin compositions of the Examples and Comparative Examples were evaluated and shown. The provision of inkjet printing was evaluated by the availability of coating by an inkjet printer machine. Hereinafter, evaluation methods will be explained in more detail.

<Measurement of Shear Viscosity of Resin Composition>

The shear viscosity of a resin composition at a temperature of about 25° C. was measured by a JIS Z8803 method. The shear viscosity of the resin composition was measured under speed conditions of about 10 revolutions per minute (rpm) using a viscometer TVE-25L (a product of TOKI SANGYO Co., Ltd.).

<Provision of Inkjet Printing of Resin Composition>

The resin composition prepared was applied to a thickness of about 50 μm on a soda-lime glass (product of Central Glass Co., Ltd.) using an inkjet printer (a product of MICROJET Co.). Ultraviolet was irradiated to the resin composition applied for curing, and the appearance of the cured product (i.e., an adhesive member) after curing was observed. Ultraviolet was irradiated using a UV-LED lamp having a wavelength peak in a range of about 365±5 nm with an intensity of about 500 milliwatts per square centimeters (mW/cm$^2$) for about 2 seconds. In Table 2, a case where the resin composition was discharged stably and to a uniform thickness was designated by "O", and a case where the resin composition was not discharged from the inkjet printer was designated by "X".

<180° Peel Strength of Adhesive Member>

The resin composition prepared was applied on a soda-lime glass (product of Central Glass Co., Ltd.) having a size of about 26 millimeters (mm)×76 mm, using an inkjet printer (a product of MICROJET Co.) to a thickness of about 50 μm. In the atmosphere (i.e., in the presence of oxygen), on the resin composition applied, ultraviolet was irradiated using UV-LED lamps having peaks of about 405 nm and about 365 nm such that the total dosages of light were about 220 mJ/cm$^2$ and about 380 mJ/cm$^2$, respectively, to form an adhesive member. On the adhesive member, a PET film (a product of TOYOBO Co., Ltd., a product name of A4360, a thickness of about 50 μm) cut into a size of about 20 mm×150 mm was provided and attached with a pressure of about 0.15 megapascals (MPa) to obtain a sample.

The peel strength of the sample obtained was measured three times at room temperature using a Universal testing Machine (Instron Corporation, a product 5965 type) at a rate of about 300 mm/min such that a peel angle became 180°. An average value of about 50 mm peel was obtained, the value obtained was multiplied by 1.25 times, and a peel strength with respect to a width of about 25 mm was recorded. The peel strength of the compositions which were impossible to provide for inkjet printing was not measured.

oligomer having the glass transition temperature of about 110° C. to about 140° C., and low adhesiveness is shown after being cured in the presence of oxygen.

It could be found that the resin composition of Comparative Example 5 has the shear viscosity of greater than about 50 mPa·s, which is measured by a JIS Z8803 method at a temperature of about 25° C. If the resin composition of Comparative Example 5 having the shear viscosity of greater than about 90 mPa·s is provided by an inkjet printing method, it is impossible to discharge from a machine. It could be found that since the resin composition of Com-

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Shear viscosity at 25° C. [mPa · s] | 19 | 25 | 47 | 14 | 28 | 19 | 30 | 90 |
| 180° peel strength [gf/25 mm] | 650 | 1300 | 1200 | 50 | 200 | 30 | 40 | — |
| Inkjet printing provision | ○ | ○ | ○ | ○ | ○ | ○ | ○ | X |

Referring to Table 2, it could be found that the resin compositions of Examples 1 to 3 showed the shear viscosity of about 8 mPa·s to about 50 mPa·s, which is measured by a JIS Z8803 method at a temperature of about 25° C. In addition, if provided by an inkjet printing method, it could be found that the resin compositions of Examples 1 to 3 were stably discharged and applied with uniform thicknesses. Accordingly, the resin composition of an embodiment having the shear viscosity of about 8 mPa·s to about 50 mPa·s, which is measured by a JIS Z8803 method at a temperature of about 25° C., may show excellent discharge stability.

It could be found that the adhesive members formed from the resin compositions of Examples 1 to 3 have the 180° peel strength of about 300 gf/25 mm to about 1500 gf/25 mm at room temperature. Accordingly, the adhesive member formed from the resin composition of an embodiment may show excellent adhesion reliability.

It could be found that the adhesive members formed from the resin compositions of Comparative Examples 1 to 3 have the 180° peel strength of less than about 300 gf/25 mm at room temperature. As explained referring to Table 1, the resin composition of Comparative Example 1 does not include a (meth)acrylate oligomer, and the resin composition of Comparative Example 2 includes (meth)acrylate oligomer S-3 having the glass transition temperature of less than about 110° C. The resin composition of Comparative Example 3 includes (meth)acrylate oligomer S-4 having the glass transition temperature of greater than about 140° C. Accordingly, it is considered that the adhesive members formed from the resin compositions of Comparative Examples 1 to 3 showed low adhesiveness.

In Table 1, the resin composition of Comparative Example 4 does not include a (meth)acrylate oligomer having the glass transition temperature of about 110° C. to about 140° C. but includes a tackifier. It could be found that an adhesive member formed by curing the resin composition of Comparative Example 4, including a tackifier, in the presence of oxygen shows low adhesiveness. Referring to Table 2, it could be found that the adhesive member formed from the resin composition of Comparative Example 4 has the 180° peel strength of less than about 300 gf/25 mm at room temperature. It is considered that the resin composition of Comparative Example 4 does not include a (meth)acrylate parative Example 5 has a relatively high shear viscosity, the provision by an inkjet printing method is unsuitable.

The resin composition of an embodiment may include at least one (meth)acrylate oligomer having a glass transition temperature of about 110° ° C. to about 140° C., at least one (meth)acrylate monomer including a (meth)acryloyl group, at least one urethane (meth)acrylate oligomer, and at least one photoinitiator. The resin composition may have a shear viscosity of about 8 mPa·s to about 50 mPa·s, which is measured by a JIS Z8803 method at a temperature of about 25° C. Accordingly, the resin composition of an embodiment may show excellent discharge stability.

The display device of an embodiment may include an adhesive member disposed between a display panel and a window. The adhesive member may include a polymer derived from the resin composition of an embodiment. The adhesive member of an embodiment may be formed by curing the resin composition of an embodiment in the presence of oxygen. Accordingly, the adhesive member of an embodiment may show excellent adhesion reliability. The display device including the adhesive member of an embodiment may show excellent reliability.

The resin composition of an embodiment has a low shear viscosity and may show excellent discharge stability.

The adhesive member of an embodiment includes a (meth)acrylate oligomer satisfying a certain glass transition temperature and may show excellent adhesion reliability.

The display device of an embodiment includes an adhesive member having high adhesiveness and may show excellent reliability in various operations.

Although the embodiments of the present invention have been described, it is understood that the present invention should not be limited to these embodiments, but various changes and modifications can be made by one ordinary skilled in the art within the spirit and scope of the present invention as hereinafter claimed.

What is claimed is:

1. A resin composition comprising:
   at least one (meth)acrylate oligomer having a glass transition temperature of about 110 degrees in Celsius (° C.) to about 140° C.;
   at least one (meth)acrylate monomer comprising a (meth) acryloyl group;

at least one urethane (meth)acrylate oligomer; and at least one photoinitiator, wherein the resin composition has a shear viscosity of about 8 millipascal seconds (mPa·s) to about 50 mPa·s, which is measured by a JIS Z8803 method at a temperature of about 25° C.

2. The resin composition of claim 1, wherein a weight of the at least one (meth)acrylate oligomer is about 1 percentage by weight (wt %) to about 20 wt % with respect to a total weight of the resin composition.

3. The resin composition of claim 1, wherein the at least one (meth)acrylate oligomer comprises a copolymer derived from a first monomer and a second monomer which is different from the first monomer.

4. The resin composition of claim 3, wherein each of the first monomer and the second monomer comprises any one among (meth)acrylic acid methyl, (meth)acrylic acid isobornyl, (meth)acrylic acid dicyclopentanyl, (meth)acrylic acid cyclohexyl, and (meth)acrylic acid adamantyl.

5. The resin composition of claim 3, wherein the copolymer comprises a first repeating unit derived from the first monomer, and a second repeating unit derived from the second monomer, and a composition ratio of the first repeating unit and the second repeating unit is about 5:5 to about 9:1.

6. The resin composition of claim 3, wherein a polydispersity index of the copolymer is about 1.2 to about 1.7.

7. The resin composition of claim 1, wherein a weight-average molecular weight of the at least one (meth)acrylate oligomer is about 4000 to about 20,000.

8. The resin composition of claim 1, wherein a weight-average molecular weight of the at least one urethane (meth)acrylate oligomer is about 5000 to about 40,000.

9. The resin composition of claim 1, wherein a weight of the at least one (meth)acrylate monomer is about 40 wt % to about 90 wt % with respect to a total weight of the resin composition.

10. The resin composition of claim 1, wherein the at least one (meth)acrylate monomer comprises at least one among 4-hydroxybutyl acrylate, 2-ethylhexyl acrylate, tetrahydrofurfuryl acrylate, and 2-ethylhexyl-diglycol acrylate.

11. The resin composition of claim 1, wherein the resin composition has a 180° peel strength of about 300 gf/25 mm to about 1500 gf/25 mm at room temperature with respect to a glass substrate after ultraviolet curing in presence of oxygen.

12. The resin composition of claim 1, wherein the at least one photoinitiator comprises a radical polymerization initiator.

13. The resin composition of claim 1, wherein the resin composition is provided by an inkjet printing method or a dispensing method.

14. An adhesive member comprising a polymer derived from a resin composition having a shear viscosity of about 8 mPa·s to about 50 mPa·s, which is measured by a JIS Z8803 method at a temperature of about 25° C., wherein the resin composition comprises:

at least one (meth)acrylate oligomer having a glass transition temperature of about 110° ° C. to about 140° C.;

at least one (meth)acrylate monomer comprising a (meth)acryloyl group;

at least one urethane (meth)acrylate oligomer; and at least one photoinitiator.

15. The adhesive member of claim 14, wherein the adhesive member has a 180° peel strength of about 300 gf/25 mm to about 1500 gf/25 mm at room temperature with respect to a glass substrate.

16. The adhesive member of claim 14, wherein a weight of the at least one (meth)acrylate oligomer is about 1 wt % to about 20 wt % with respect to a total weight of the resin composition.

17. The adhesive member of claim 14, wherein the at least one (meth)acrylate oligomer comprises a copolymer derived from a first monomer and a second monomer which is different from the first monomer.

18. The adhesive member of claim 17, wherein each of the first monomer and the second monomer comprises any one among (meth)acrylic acid methyl, (meth)acrylic acid isobornyl, (meth)acrylic acid dicyclopentanyl, (meth)acrylic acid cyclohexyl, and (meth)acrylic acid adamantyl.

19. The adhesive member of claim 14, wherein a weight of the at least one (meth)acrylate monomer is about 40 wt % to about 90 wt % with respect to a total weight of the resin composition.

20. A display device comprising:

a display panel;

a window disposed on the display panel; and an adhesive member disposed between the display panel and the window, and comprising a polymer derived from a resin composition having a shear viscosity of about 25° C. of about 8 mPa·s to about 50 mPa·s, which is measured by a JIS Z8803 method at a temperature, wherein the resin composition comprises:

at least one (meth)acrylate oligomer having a glass transition temperature of about 110° ° C. to about 140° C.;

at least one (meth)acrylate monomer comprising a (meth)acryloyl group;

at least one urethane (meth)acrylate oligomer; and at least one photoinitiator.

21. The display device of claim 20, wherein the adhesive member has a 180° peel strength of about 300 gf/25 mm to about 1500 gf/25 mm at room temperature with respect to a glass substrate.

22. The display device of claim 20, further comprising a light controlling layer disposed between the adhesive member and the window, and an optical adhesive layer disposed between the light controlling layer and the window, wherein the optical adhesive layer comprises the polymer derived from the resin composition.

23. The display device of claim 20, wherein the display device is divided into a folding area foldable with respect to a folding axis, and a non-folding area adjacent to the folding area.

* * * * *